US011411866B1

(12) United States Patent
Barth et al.

(10) Patent No.: US 11,411,866 B1
(45) Date of Patent: Aug. 9, 2022

(54) SUPPORTING MULTIPLE SEGMENT ROUTING TRAFFIC ENGINEERING ALGORITHMS

(71) Applicant: Juniper Networks, Inc., Sunnyvale, CA (US)

(72) Inventors: Jonathan C. Barth, Collegeville, PA (US); Shraddha Hegde, Bangalore (IN); William Britto Arimboor Joseph, Bangalore (IN); Vishnu Pavan Beeram, Naperville, IL (US); Tarek Saad, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 53 days.

(21) Appl. No.: 17/164,282

(22) Filed: Feb. 1, 2021

(51) Int. Cl.
*H04L 45/50* (2022.01)
*H04L 45/12* (2022.01)
*H04L 45/00* (2022.01)
*H04L 45/02* (2022.01)
*H04L 45/28* (2022.01)

(52) U.S. Cl.
CPC .............. *H04L 45/50* (2013.01); *H04L 45/02* (2013.01); *H04L 45/12* (2013.01); *H04L 45/28* (2013.01); *H04L 45/34* (2013.01)

(58) Field of Classification Search
CPC ......... H04L 45/50; H04L 45/02; H04L 45/12; H04L 45/28; H04L 45/00; H04L 45/34
See application file for complete search history.

(56) References Cited

U.S. PATENT DOCUMENTS

| 6,985,959 B1 * | 1/2006 | Lee .......................... H04L 45/00 709/230 |
| 7,903,554 B1 * | 3/2011 | Manur ................... H04L 47/724 370/254 |
| 10,637,768 B1 | 4/2020 | Joseph et al. |
| 2011/0110272 A1 * | 5/2011 | Kim ........................ H04L 41/12 370/255 |
| 2020/0344151 A1 | 10/2020 | Joseph et al. |

OTHER PUBLICATIONS

Psenak, et al.; "IGP Flexible Algorithm draft-ietf-lsr-flex-algo-13"; Network Working Group Internet-Draft; Oct. 22, 2020; pp. 1-37.
Filsfils, et al.; "Segment Routing Architecture"; Internet Engineering Task Force (IETF); Standards Track; ISSN: 2070-1721; Jul. 2018; pp. 1-32.

* cited by examiner

*Primary Examiner* — Mohamed A Kamara
(74) *Attorney, Agent, or Firm* — Harrity & Harrity, LLP

(57) ABSTRACT

In some implementations, a network device may identify a segment routing traffic engineering (SR-TE) algorithm supported by the network device. The network device may determine, based on identifying the SR-TE algorithm, an identification value associated with the network device. The network device may generate an advertisement packet that includes the identification value and information identifying the SR-TE algorithm. The network device may send the advertisement packet to another network device to cause the other network device to update a data structure to indicate that the network device supports the SR-TE algorithm and that the network device is associated with the identification value. The other network device may determine, using the SR-TE algorithm, a forwarding path for a data packet that indicates the network device as a hop in the forwarding path.

20 Claims, 12 Drawing Sheets

SUPPORTING MULTIPLE SEGMENT ROUTING TRAFFIC ENGINEERING ALGORITHMS

BACKGROUND

Segment routing relates to an ingress network device in a segment routing domain that steers traffic (e.g., a packet) by dictating a forwarding path as a set of encoded instructions (e.g., a segment identifier) in the packet from the ingress network device to an egress network device of the segment routing domain.

SUMMARY

In some implementations, a method includes identifying, by a network device, a segment routing traffic engineering (SR-TE) algorithm supported by the network device; determining, by the network device and based on identifying the SR-TE algorithm, an identification value associated with the network device; generating, by the network device, an advertisement packet that includes the identification value and information identifying the SR-TE algorithm; and sending, by the network device, the advertisement packet to another network device to cause the other network device to perform one or more actions.

In some implementations, a network device includes one or more memories; and one or more processors to: receive an advertisement packet from another network device, wherein the advertisement packet includes information identifying a segment routing traffic engineering (SR-TE) algorithm and an identification value; determine, based on the identification value, an identifier associated with the other network device; update, based on the identification value, a data structure to indicate that the other network device supports the SR-TE algorithm and that the other network device is associated with the identifier; and perform one or more actions based on updating the data structure.

In some implementations, a non-transitory computer-readable medium storing a set of instructions includes one or more instructions that, when executed by one or more processors of a network device, cause the network device to: identify a segment routing traffic engineering (SR-TE) algorithm supported by the network device; determine, based on identifying the SR-TE algorithm, an identification value that is associated with the network device and SR-TE algorithm; generate an advertisement packet that includes the identification value; and send the advertisement packet to another network device to cause the other network device to update a data structure associated with the other network device to indicate that the network device supports the SR-TE algorithm.

DETAILED DESCRIPTION

Figure 1A:
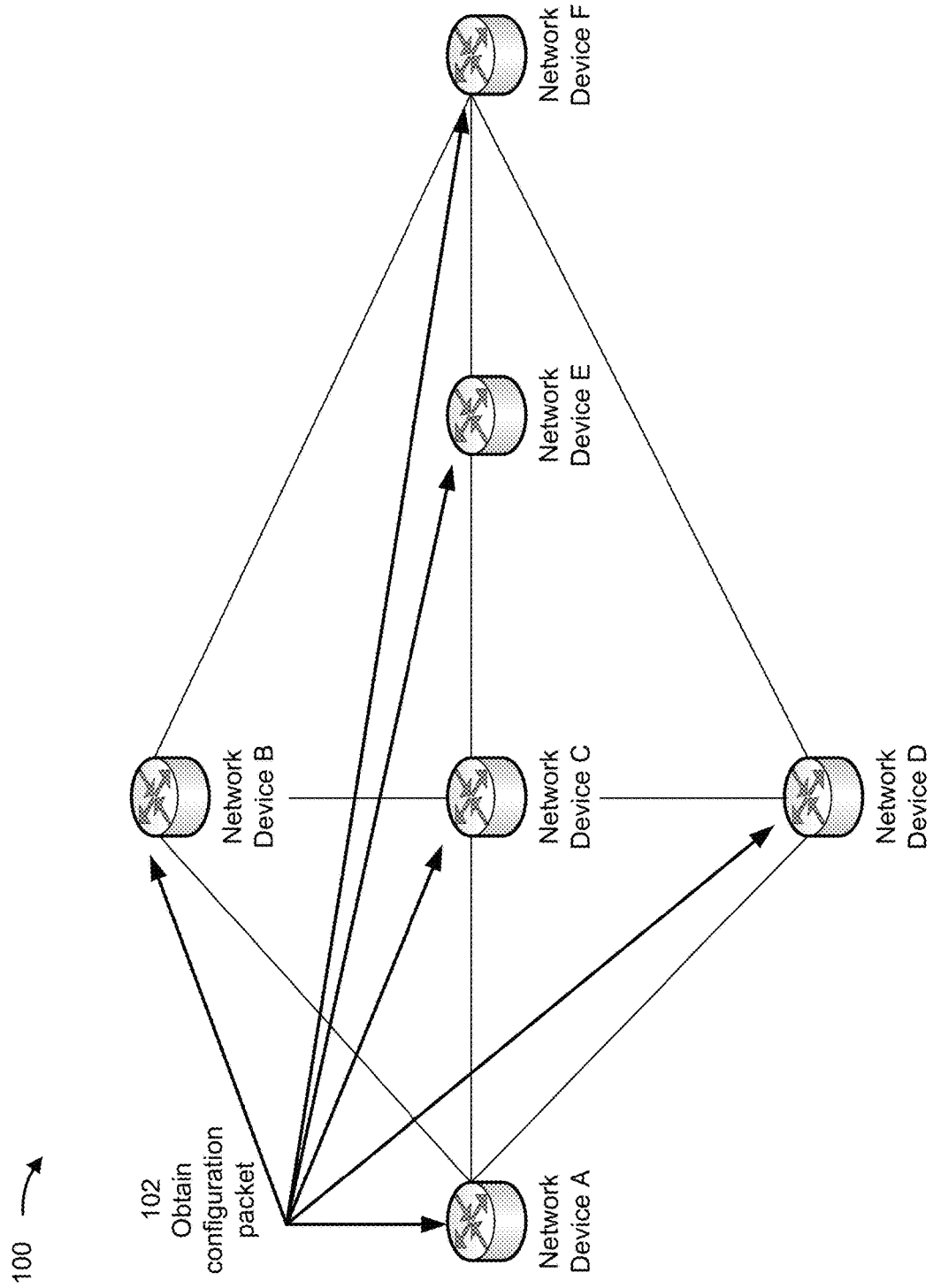
FIGS. 1A-1F are diagrams of an example implementation described herein.

The following detailed description of example implementations refers to the accompanying drawings. The same reference numbers in different drawings may identify the same or similar elements.

A network comprises network devices (e.g., routers and/or similar devices) that allow computing devices associated with the network to communicate data. The network devices may use a routing protocol, such as an interior gateway protocol (IGP), that allows the network devices to share information associated with the network devices and a topology of the network. Accordingly, each network device may maintain a data structure, such as a link state database (LSDB) or a traffic engineering database (TED), that includes the information associated with the network devices and the topology of the network. Moreover, the network devices may support a segment routing protocol, such as a source packet routing in networking (SPRING) protocol, that provides segment routing within a segment routing domain of the network. As such, a network device may cause a data packet to be forwarded through the network based on a list of segment identifiers (also referred to as a "segment list") that is applied to the packet (e.g., via encapsulation) when the packet is forwarded through the network.

In some cases, the network devices may support one or two default segment routing traffic engineering (SR-TE) algorithms for routing data packets based on characteristics or constraints of the network devices, characteristics or constraints of the links between the network devices, and/or other characteristics or constraints of the network. For example, a network device may determine a forwarding path for a data packet based on a shortest path first algorithm associated with IGP metrics, such as an IGP metric algorithm or a strict IGP metric algorithm. The network device then encapsulates the data packet with one or more segment identifiers associated with the forwarding path and forwards the data packet according to the data path. For example, the network device sends the data packet to a next "hop" of the forwarding path, which is the next network device in the forwarding path.

However, issues arise when a network device that receives a data packet is not able to forward the data according to the forwarding path (e.g., the network device is not able to forward the data packet to a next hop of the forwarding path due to a link that is down between the network device and the next hop). In such cases, the network device may use the same default SR-TE algorithm, or a different default SR-TE, to determine a new forwarding path for the data packet. However, the new forwarding path may have the same or similar issues as the original forwarding path or may prioritize different characteristics or constraints of the network devices, different characteristics or constraints of the links between the network devices, and/or other different characteristics or constraints of the network to cause the data packet to be routed on a sub-optimal path through the network. This often wastes computing resources (e.g., processing resources, memory resources, communication resources, and/or power resources, among other examples) of one or more network devices of the network to route the packet according to the new forwarding path. This also causes, in some cases, the data packet to be routed in a way that violates one or more quality of service (QoS) requirements associated with the network and therefore impacts a performance of the network.

Some implementations described herein provide a network of network devices that support multiple SR-TE algorithms (e.g., beyond just one or two default SR-TE algorithms). A network device may maintain a data structure (e.g., a database, a table, and/or the like) that identifies one or more SR-TE algorithms supported by the network device. In some implementations, a network device may determine a respective identification value associated with the network device for each of the one or more SR-TE algorithms. An identification value may be a unique identifier of the network device for an SR-TE algorithm or may be an offset value associated with the SR-TE algorithm (e.g., that may be used to generate the unique identifier of the network device). The network device may generate an advertisement packet that includes the identification value and may send the advertisement packet to another network device in the network.

In some implementations, the other network device may process the advertisement packet to determine an identifier associated with the network device (e.g., the unique identifier of the network device for the SR-TE algorithm) and may update a data structure to indicate that the network device supports the SR-TE algorithm and that the network device is associated with the identifier. Accordingly, the other network device may determine, based on updating the data structure and using the SR-TE algorithm, a forwarding path for a data packet and may forward the data packet according to the forwarding path. Additionally, or alternatively, the other network device may receive a data packet (e.g., a different data packet), may process the data packet to determine that the network device cannot forward the data packet according to a forwarding path of the data packet, may determine, using the SR-TE algorithm, a different forwarding path for the data packet, and may forward the data packet according to the different forwarding path.

In this way, some implementations described herein provide a network of network devices that support multiple SR-TE algorithms beyond just one or two default SR-TE algorithms. Accordingly, a network device can determine a forwarding path for a data packet using a particular SR-TE algorithm that is based on characteristics or constraints of the network devices, characteristics or constraints of the links between the network devices, and/or other characteristics or constraints of the network that are ignored or weighted differently using a conventional, default SR-TE algorithm, such as an IGP metric algorithm. Moreover, a network device can determine a new forwarding path for a data packet using the particular SR-TE algorithm, rather than just a default SR-TE algorithm, when the network device cannot forward the data packet according to an original forwarding path. In this way, the network device causes the data packet to be forwarded on an optimal forwarding path (e.g., in relation to the characteristics or constraints of the network devices, the characteristics or constraints of the links between the network devices, and/or the other characteristics or constraints of the network), which, in many cases, is not possible when using a conventional, default SR-TE algorithm. This conserves computing resources (e.g., processing resources, memory resources, communication resources, and/or power resources, among other examples) of network devices that would other be used to route the data packet or to determine a new forwarding path for the data packet. This also increases a likelihood that the data packet is routed in a way that one or more QoS requirements associated with the network are satisfied and therefore provides a more reliable performance of the network.

FIGS. 1A-1F are diagrams of one or more example implementations 100 described herein. FIGS. 1A-1F are diagrams of an example implementation related to supporting multiple segment routing traffic engineering algorithms. As shown in FIGS. 1A-1F, example implementation 100 includes a plurality of network devices (shown as the network devices A-F), which are described in more detail below in connection with FIGS. 2-4. The plurality of network devices may be associated with a network that connects endpoint devices (not shown). The network may include one or more wired and/or wireless networks in a segment routing domain.

As shown in FIG. 1A, and by reference number 102, the plurality of network devices may obtain a configuration packet. For example, a set of network devices, of the plurality of network devices, may send (e.g., directly or indirectly) the configuration packet to each other network device of the plurality of network devices. The configuration packet may include information identifying an SR-TE algorithm (e.g., information identifying a pre-defined SR-TE algorithm) and/or an offset value associated with the SR-TE algorithm. Accordingly, a network device may receive and process the configuration packet to identify the information identifying the SR-TE algorithm and/or the offset value associated with the SR-TE algorithm. The network device may store, or cause to be stored, the information identifying the SR-TE algorithm and/or the offset value associated with the SR-TE algorithm in an entry (e.g., that is associated with the SR-TE algorithm) of a data structure associated with the network device. Alternatively, the network device may be manually configured with the information identifying the SR-TE algorithm and/or the offset value (e.g., the entry of the data structure may be caused to include the information identifying the SR-TE algorithm and/or the offset value based on input by a network administrator via a user interface associated with the network device).

The offset value may be used to determine an identification value of a network device that is associated with the SR-TE algorithm. For example, a network device that receives the configuration packet may add the offset value to a default identification value, such as a default segment identifier of the network device (e.g., that is associated with a default SR-TE algorithm), to determine the identification value of the network device for the SR-TE algorithm.

Figure 1B:
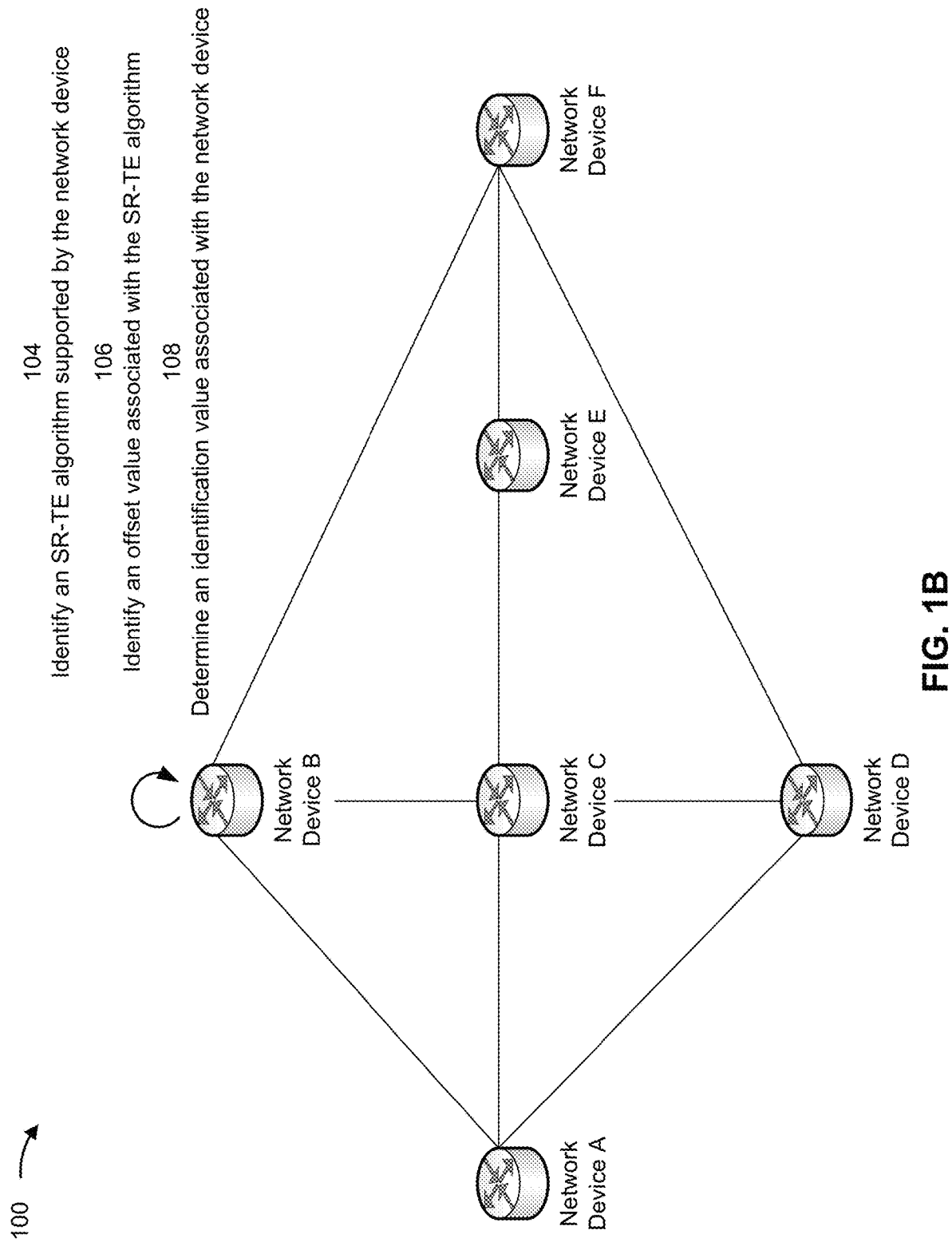

As shown in FIG. 1B, and by reference number 104, a network device (shown as the network device B), of the plurality of network devices, may identify an SR-TE algorithm supported by the network device (e.g., within the segment routing domain). The SR-TE algorithm may be, for example, an IGP metric algorithm, a strict IGP metric algorithm, a traffic engineering (TE) metric algorithm, a strict TE metric algorithm, a delay metric algorithm, a strict delay metric algorithm, and/or the like. For example, the network device may search a data structure associated with the network device to identify an entry associated with the SR-TE algorithm and may obtain information from the entry indicating whether the network device supports the SR-TE algorithm (e.g., supported or not supported).

As further shown in FIG. 1B, and by reference number 106, the network device (shown as the network device B) may identify an offset value associated with the SR-TE algorithm. For example, the network device may search the data structure associated with the network device to identify the entry associated with the SR-TE and may obtain an offset value from the entry. As further shown in FIG. 1B, and by reference number 108, the network device may determine an identification value associated with the network device. In some implementations, the identification value may be the offset value (e.g., that was obtained from the entry of the data structure). In some implementations, the identification value may be based on the offset value and a default identification value associated with the network device, such as a default segment identifier of the network device (e.g., that is associated with a default SR-TE algorithm). For example, the network device may search the data structure associated with the network device to identify an entry associated with the default SR-TE algorithm and may obtain a default identification value from the entry. The network device may sum the offset value and the default identification value to obtain the identification value associated with the network device.

Figure 1C:
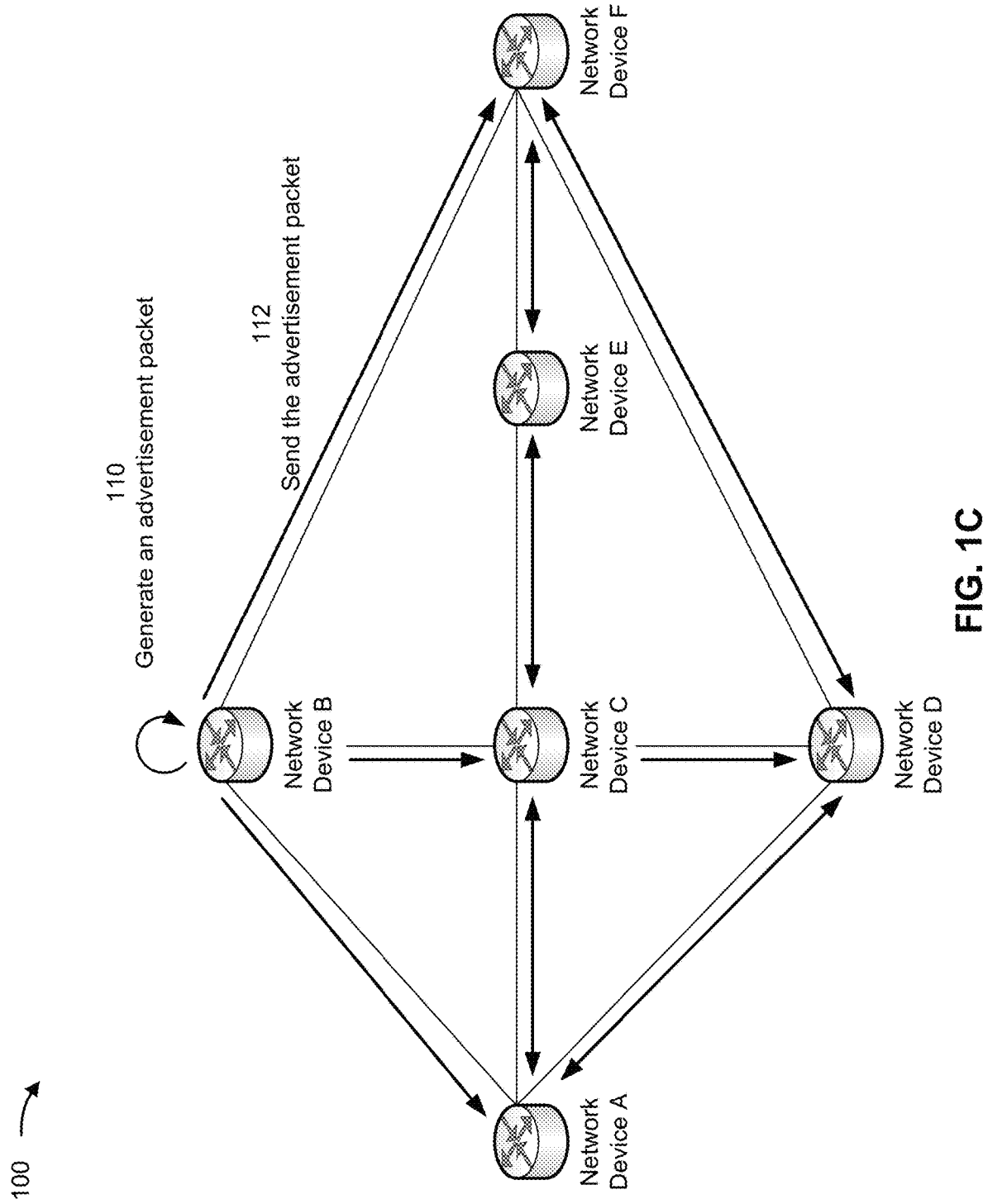

As shown in FIG. 1C, and by reference number 110, the network device (shown as the network device B) may generate an advertisement packet. The advertisement packet may include the identification value, information identifying the SR-TE algorithm, and/or the like. In some implementations, the advertisement packet may comprise an intermediate system to intermediate system (ISIS) packet (e.g., an ISIS advertisement packet). The identification value, the information identifying the SR-TE algorithm, and/or the like may be included in a sub-type, length, and value (sub-TLV) of the ISIS packet. In some implementations, the advertisement packet may comprise an open shortest path first (OSPF) packet. The identification value, the information identifying the SR-TE algorithm, and/or the like may be included in a sub-TLV of the OSPF packet.

As further shown in FIG. 1C, and by reference number 112, the network device (shown as the network device B) may send (e.g., directly or indirectly) the advertisement packet to one or more other network devices of the plurality of network devices. For example, the network device B may directly send the advertisement packet to network device A, network device C, and/or network device F (e.g., via respective links between network device B and network device A, network device C, network device F). Additionally, or alternatively, the network device may indirectly send the advertisement packet to network device D and/or network device E (e.g., via network device A, network device C, and network device F).

Figure 1D:
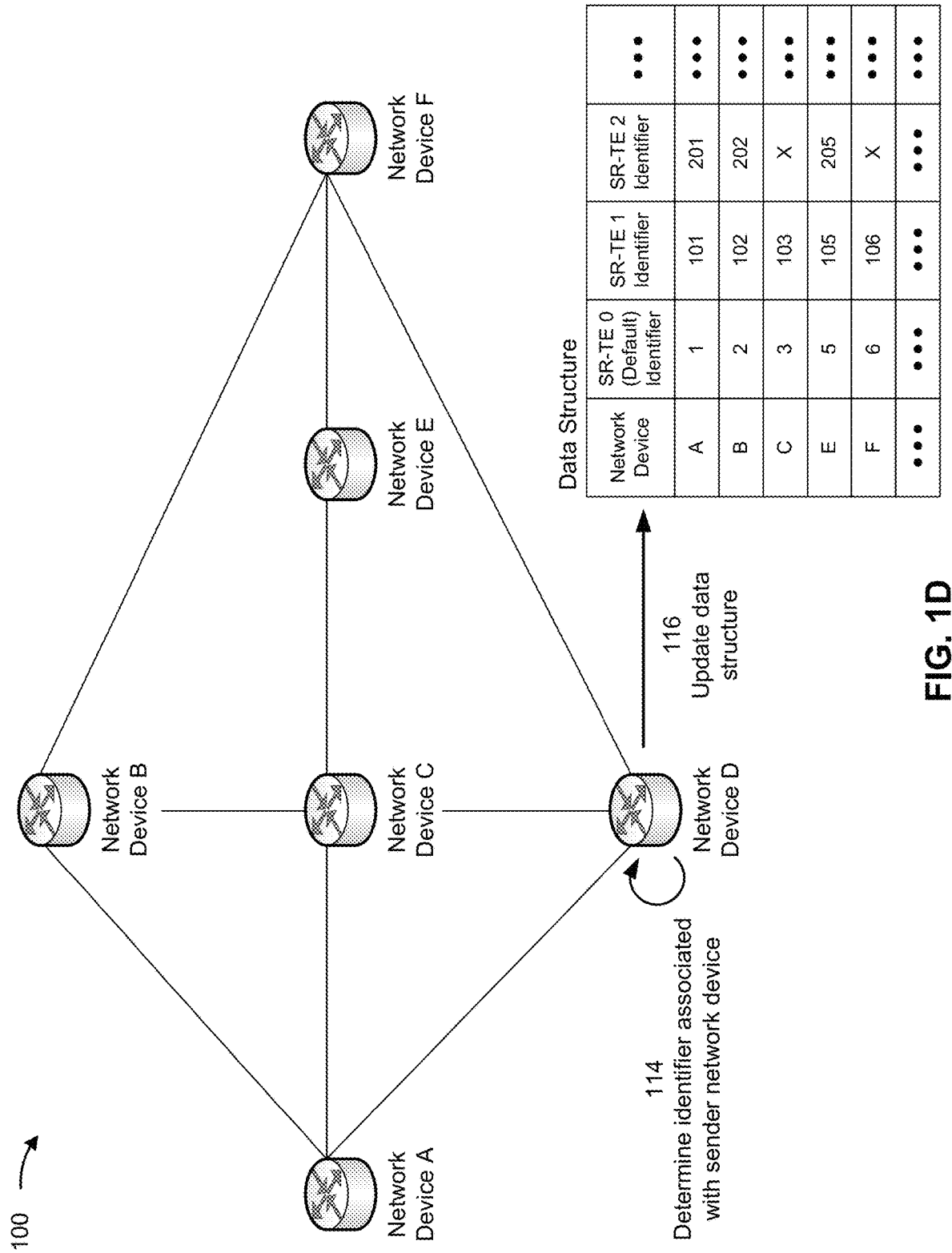

In some implementations, a network device may maintain a data structure (e.g., a forwarding table or a similar data structure) that includes a respective entry for at least one other network device of the plurality of network devices. For example, as shown in FIG. 1D, the network device D may maintain a data structure that includes a respective entry for network device A, network device B, network device C, network device E, and network device F. An entry associated with a network device may include a respective identifier for a plurality of SR-TE algorithms. For example, an entry associated with network device A may include an identifier 1 for an SR-TE 0 algorithm (e.g., a default SR-TE algorithm, such as an IGP metric algorithm), an identifier 101 for an SR-TE 1 algorithm (e.g., a "100" offset of the "1" identifier for the SR-TE 0 algorithm), an identifier 201 for an SR-TE 2 algorithm (e.g., a "200" offset of the "1" identifier for the SR-TE 0 algorithm), and so on. When a network device does not support a particular SR-TE algorithm, an entry associated with the network device may not include an identifier or may include another symbol (e.g., an "X") or other value to indicate that the network device does not support the particular SR-TE algorithm. For example, the entries for the network device C and the network device F each include an "X" symbol in association with the SR-TE 2 algorithm to indicate that the network device C and the network device F do not support the SR-TE 2 algorithm.

As further shown in FIG. 1D, and reference number 114, a network device, of the plurality of network devices, that has received an advertisement packet (shown as the network device D) from an advertising network device that sent the advertisement packet (e.g., network device B, as described herein in relation to FIGS. 1B-1C) may process the advertisement packet to determine an identifier associated with the advertising network device. For example, the network device may process the advertisement packet to identify information identifying an SR-TE algorithm, an identification value of the network device (e.g., that is associated with the SR-TE algorithm), and/or the like. When the identification value included in the advertisement packet is based on an offset value and a default identification value associated with the network device (e.g., as described above in relation to FIG. 1B and reference number 108), the network device may determine that the identifier associated with the advertising network device is the identification value. Alternatively, when the identification value included in the advertisement packet is an offset value, the network device may determine the identifier based on the identification value and a default identification value associated with the network device, such as a default segment identifier of the network device (e.g., that is associated with a default SR-TE algorithm). For example, the network device may sum the identification value and the default identification value to obtain the identifier associated with the network device (e.g., in a similar manner as described above in relation to FIG. 1B and reference number 108).

As further shown in FIG. 1D, and by reference number 116, the network device (shown as the network device D) may update the data structure that is associated with the network device. In some implementations, the network device may update the data structure based on the advertisement packet sent from the advertising network device. For example, the network device may update the data structure to indicate that the advertising network device supports the SR-TE algorithm, that the advertising network device is associated with the identification value (e.g., that is included in the advertisement packet), that the advertising network device is associated with the identifier (e.g., that is determined by the network device processing the advertisement packet), and/or the like. For example, when the advertisement packet is sent from network device B and associated with the SR-TE 2 algorithm, the network device D may update the data structure to include an identifier 202 (e.g., that is determined by the network device as described above in relation to reference number 114) for the SR-TE 2 algorithm.

Figure 1E:
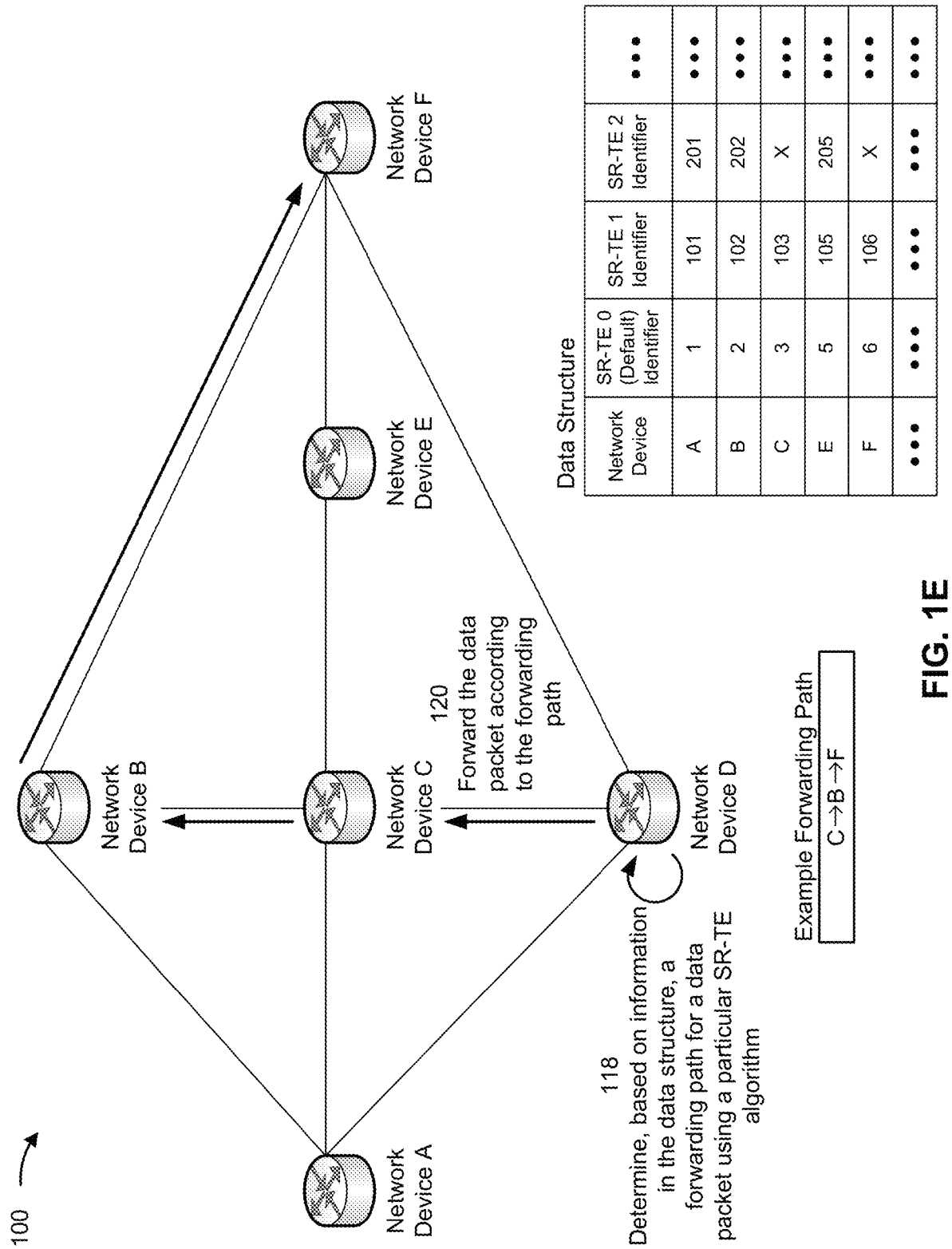

As shown in FIG. 1E, and by reference number 118, the network device (shown as the network device D) may determine a forwarding path for a data packet. For example, the network device may use a particular SR-TE algorithm (e.g., that is indicated by one or more configuration parameters associated with the network device) and information in the data structure associated with the particular SR-TE to determine the forwarding path for the data packet. For example, the network device D may use the SR-TE 1 algorithm and the respective identifiers for the network devices A-C and E-F to determine the forwarding path for the data packet. The forwarding path may indicate the advertising network device as a hop in the forwarding path (e.g., example forwarding path C→B→F shown in FIG. 1E that is associated with identifiers 103, 102, and 106).

As further shown in FIG. 1E, and by reference number 120, the network device (shown as the network device D) may forward the data packet according to the forwarding path. For example, the network device may encapsulate the data packet with one or more segment identifiers (e.g., one or more labels, headers, and/or the like) that identify hops (e.g., network devices) of the forwarding path. Accordingly, the network device may send the data packet to the first hop in forwarding path. For example, the network device may send the data packet to the network device C (e.g., via a link between the network device network device D and the network device C) as the first hop in the example forwarding path C→B→F.

Figure 1F:
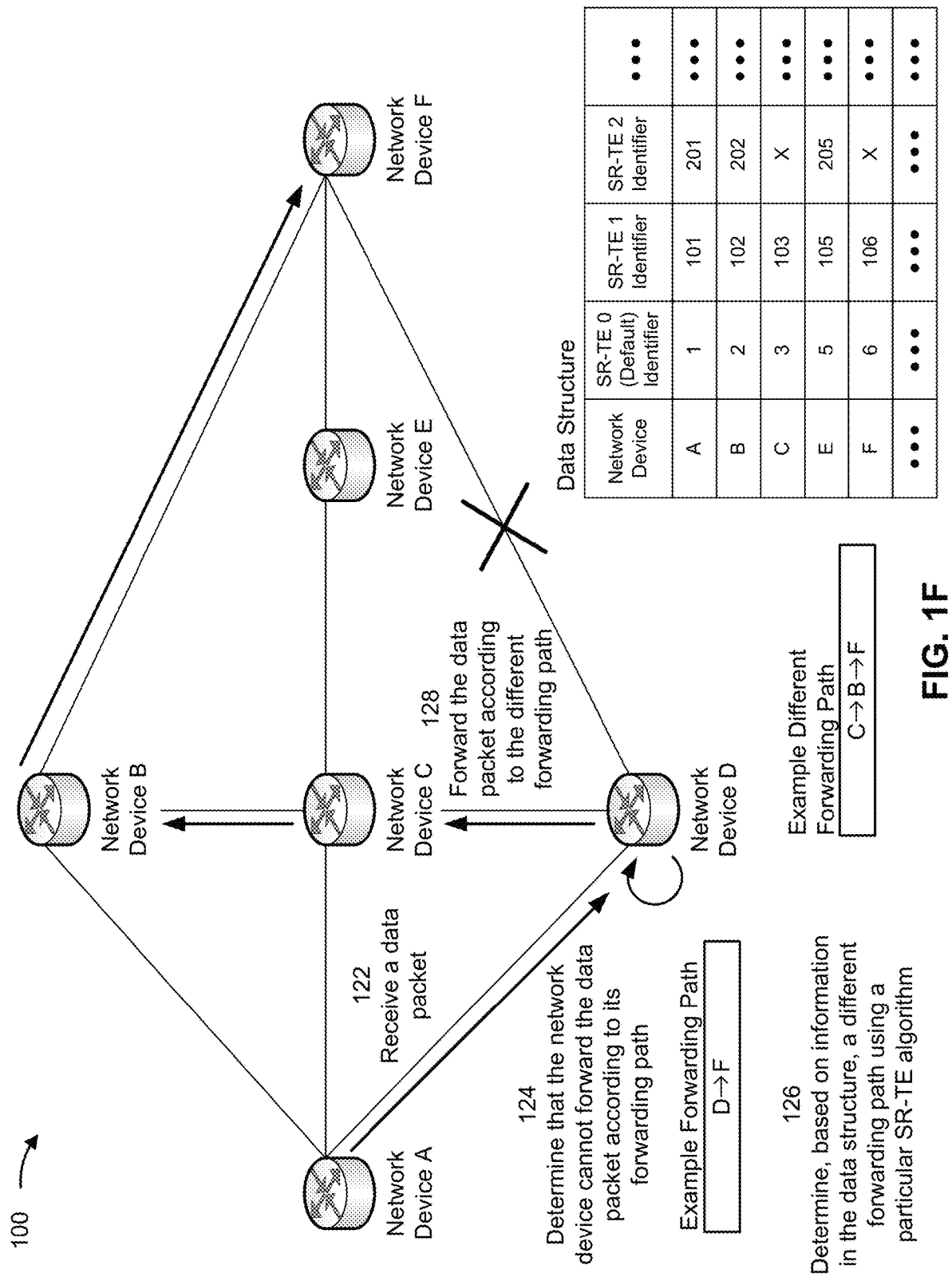

Additionally, or alternatively, as shown in FIG. 1F and by reference number 122, the network device (shown as the network device D) may receive a data packet (e.g., a data packet that has already been encapsulated by another network device for forwarding through the network according to a forwarding path determined by the other network device). For example, as shown in FIG. 1D, the network device D may receive a data packet from the network device A that is to be forwarded to network device F according to an example forwarding path D→F (e.g., that was determined by the network device A).

As further shown by FIG. 1F, and by reference number 124, the network device (shown as network device D) may determine that the network device cannot forward the data packet according to the forwarding path of the data packet. In some implementations, the network device may process the data packet to determine a next hop in the forwarding path of the data packet and may determine that the network device cannot forward the data packet to the next hop. As an example, the network device D may determine that a link between the network device D and the network device F is down, and may therefore determine that the network device D cannot forward the data packet according to the example forwarding path D→F. Accordingly, the network device may determine that the network device is to determine a different forwarding path for the data packet.

As further shown in FIG. 1F, and by reference number 126, the network device (shown as network device D) may determine a different forwarding path for the data packet. For example, the network device may identify a particular SR-TE algorithm (e.g., that is different than the SR-TE algorithm that was used to determine the forwarding path) and information in the data structure associated with the particular SR-TE to determine the different forwarding path (e.g., example different forwarding path C→B→F shown in FIG. 1F) for the data packet (e.g., in similar manner as that described herein in relation to FIG. 1E and reference number 118).

As further shown in FIG. 1F, and by reference number 128, the network device (shown as network device D) may forward the data packet according to the different forwarding path. For example, the network device may decapsulate the data packet to remove any segment identifiers (e.g., labels, headers, and/or the like) that identify hops associated with the forwarding path (e.g., the original forwarding path for the data packet) and may encapsulate the data packet with one or more segment identifiers (e.g., one or more labels, headers, and/or the like) that identify hops (e.g., network devices) of the different forwarding path. Accordingly, the network device may send the data packet to the first hop in the different forwarding path. For example, the network device may send the data packet to the network device C (e.g., via a link between the network device network device D and the network device C) as the first hop in the example different forwarding path C→B→F.

As indicated above, FIGS. 1A-1F are provided merely as one or more examples. Other examples may differ from what is described with regard to FIGS. 1A-1F.

Figure 2:
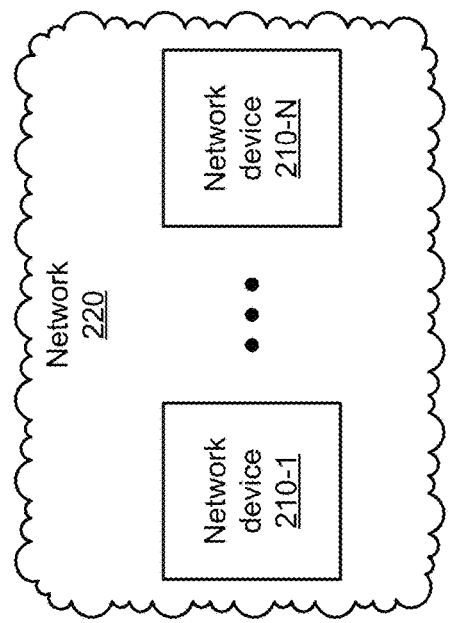
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as the network device 210-1 through network device 210-N) and a network 220. Devices of environment 200 may interconnect via wired connections, wireless connections, or a combination of wired and wireless connections.

Network device 210 includes one or more devices capable of receiving, processing, storing, routing, and/or providing traffic (e.g., a packet, such as an advertisement packet described elsewhere herein, or other information or metadata) in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
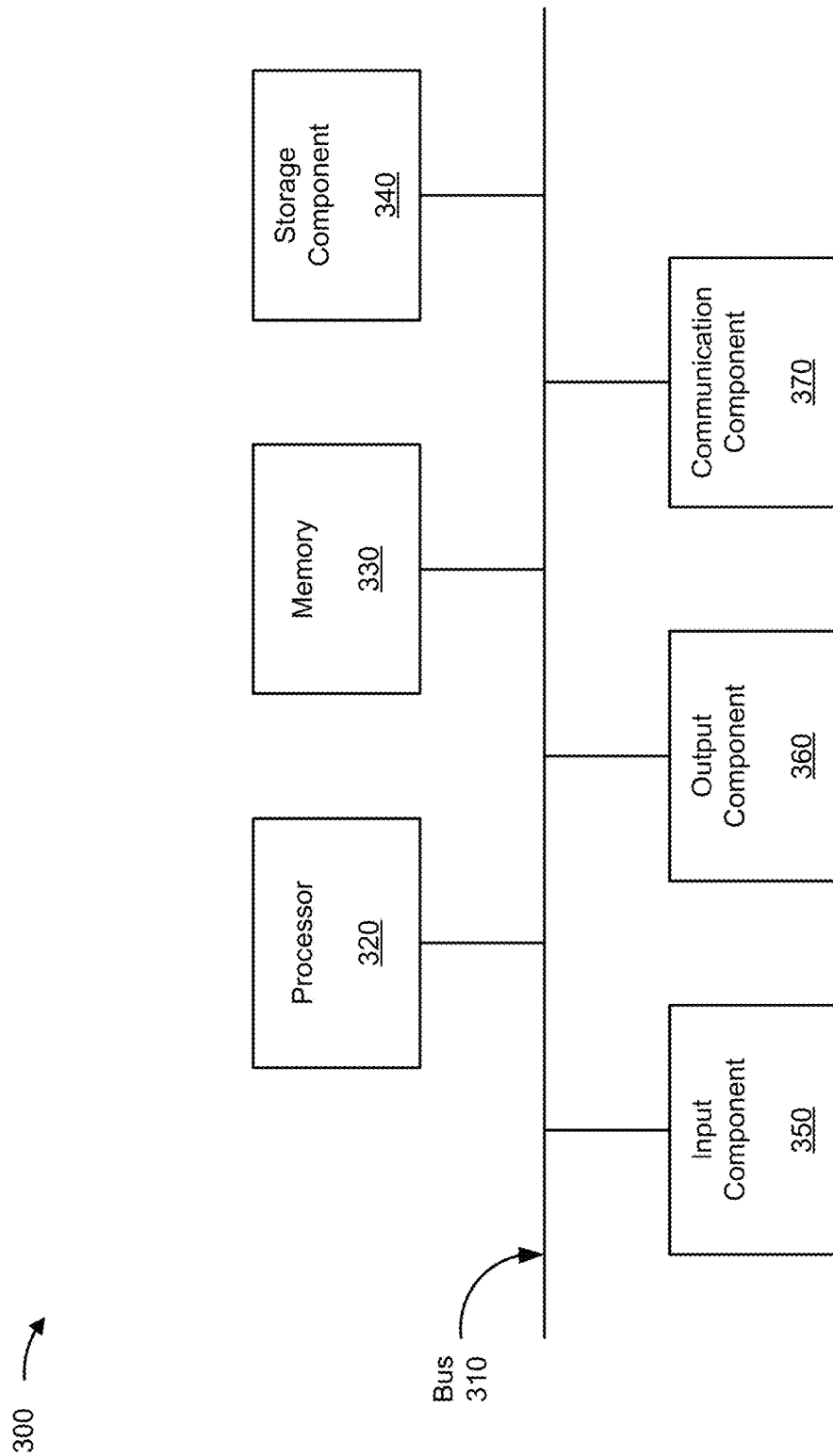
FIGS. 3 and 4 are diagrams of example components of one or more devices of FIG. 2.

FIG. 3 is a diagram of example components of a device 300, which may correspond to network device 210. In some implementations, network device 210 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
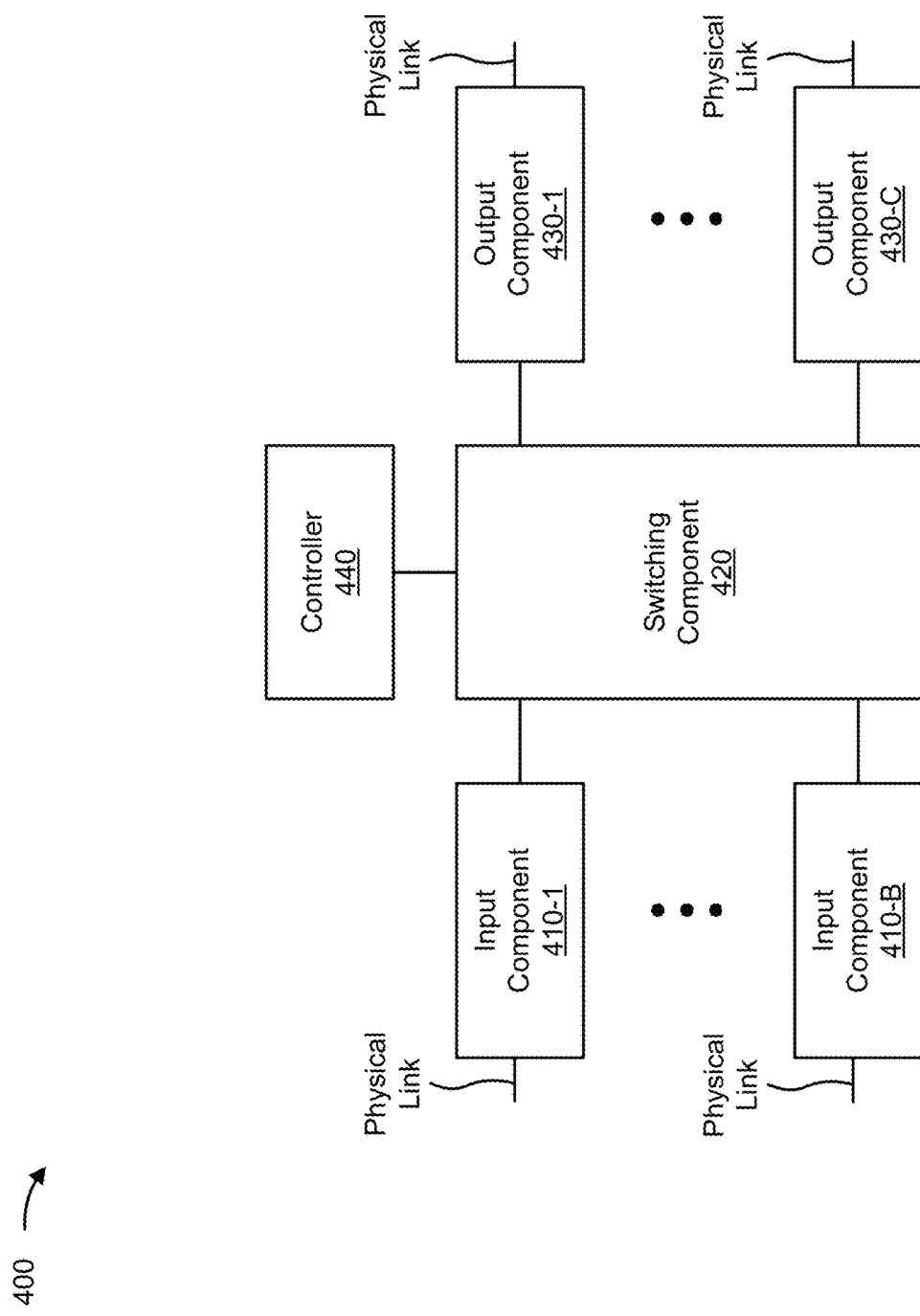

FIG. 4 is a diagram of example components of a device 400. Device 400 may correspond to network device 210. In some implementations, network device 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C(C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
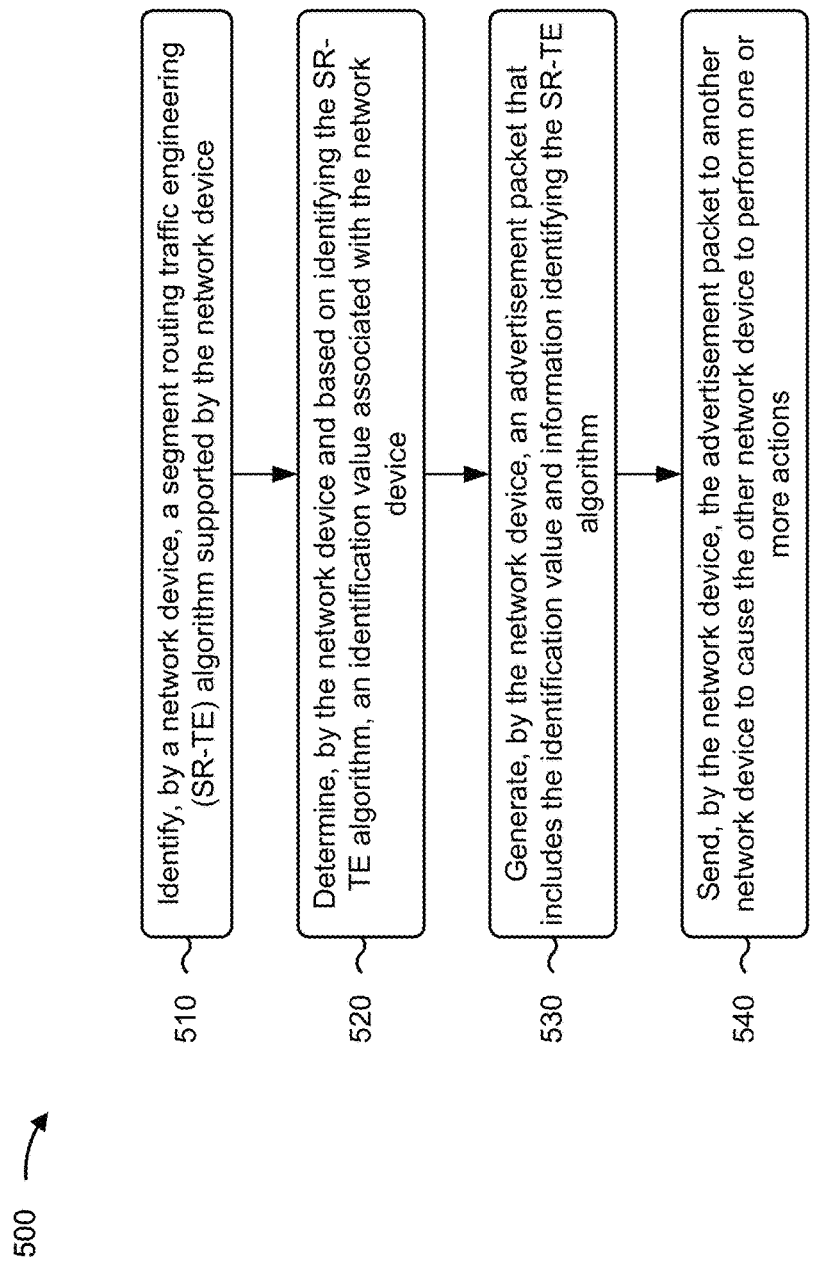
FIGS. 5-7 are flowcharts of example processes relating to supporting multiple segment routing traffic engineering algorithms.

FIG. 5 is a flowchart of an example process 500 associated with supporting multiple segment routing traffic engineering algorithms. In some implementations, one or more process blocks of FIG. 5 may be performed by a network device (e.g., network device 210). In some implementations, one or more process blocks of FIG. 5 may be performed by another device or a group of devices separate from or including the network device, such as a different network device. Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 5, process 500 may include identifying an SR-TE algorithm supported by the network device (block 510). For example, the network device may identify an SR-TE algorithm supported by the network device, as described above.

As further shown in FIG. 5, process 500 may include determining, based on identifying the SR-TE algorithm, an identification value associated with the network device (block 520). For example, the network device may determine, based on identifying the SR-TE algorithm, an identification value associated with the network device, as described above.

As further shown in FIG. 5, process 500 may include generating an advertisement packet that includes the identification value and information identifying the SR-TE algorithm (block 530). For example, the network device may generate an advertisement packet that includes the identification value and information identifying the SR-TE algorithm, as described above.

As further shown in FIG. 5, process 500 may include sending the advertisement packet to another network device to cause the other network device to perform one or more actions (block 540). For example, the network device may send the advertisement packet to another network device to cause the other network device to perform one or more actions, as described above.

Process 500 may include additional implementations, such as any single implementation or any combination of implementations described below and/or in connection with one or more other processes described elsewhere herein.

In a first implementation, determining the identification value comprises determining a default identification value associated with the network device, determining an offset value associated with the SR-TE algorithm, and determining the identification value based on the default identification value and the offset value.

In a second implementation, alone or in combination with the first implementation, the identification value is an offset value associated with the SR-TE algorithm.

In a third implementation, alone or in combination with one or more of the first and second implementations, process 500 includes receiving a configuration packet, and wherein determining the identification value comprises processing the configuration packet to identify an offset value associated with the SR-TE algorithm, and determining the identification value based on the offset value.

In a fourth implementation, alone or in combination with one or more of the first through third implementations, the advertisement packet comprises an ISIS packet, and wherein the identification value and the information identifying the SR-TE algorithm is included in a sub-TLV of the ISIS packet.

In a fifth implementation, alone or in combination with one or more of the first through fourth implementations, the advertisement packet comprises an OSPF packet, and wherein the identification value and the information identifying the SR-TE algorithm is included in a sub-TLV of the OSPF packet.

In a sixth implementation, alone or in combination with one or more of the first through fifth implementations, process 500 includes updating a data structure to indicate that the network device supports the SR-TE algorithm and that the network device is associated with the identification value.

In a seventh implementation, alone or in combination with one or more of the first through sixth implementations, process 500 includes determining an identifier associated with the network device based on the identification value and a default identification value associated with the network device, and updating a data structure to indicate that the network device supports the SR-TE algorithm and that the network device is associated with the identifier.

In an eighth implementation, alone or in combination with one or more of the first through seventh implementations, process 500 includes determining, using the SR-TE algorithm, a forwarding path for a data packet that indicates the network device as a hop in the forwarding path.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
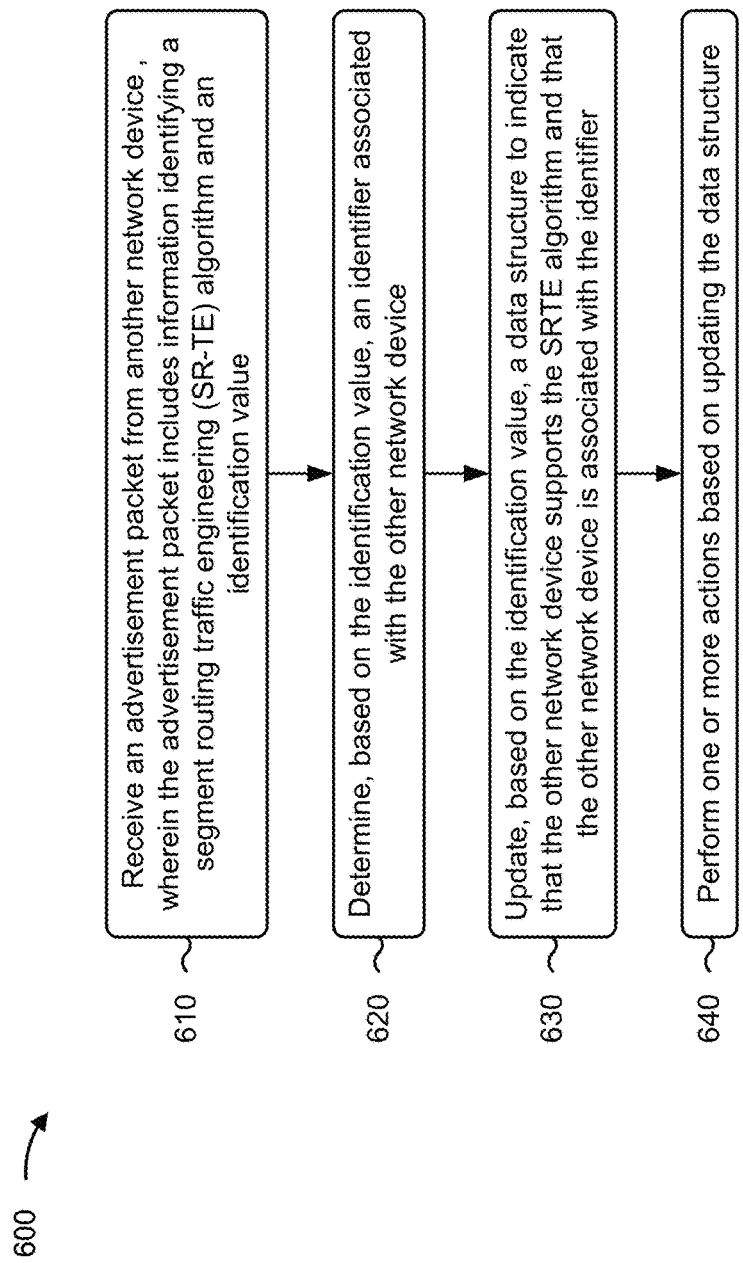

FIG. 6 is a flowchart of an example process 600 associated with supporting multiple segment routing traffic engineering algorithms. In some implementations, one or more process blocks of FIG. 6 may be performed by a network device (e.g., network device 210). In some implementations, one or more process blocks of FIG. 6 may be performed by another device or a group of devices separate from or including the network device, such as a different network device. Additionally, or alternatively, one or more process blocks of FIG. 6 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 6, process 600 may include receiving an advertisement packet from another network device, wherein the advertisement packet includes information identifying an SR-TE algorithm and an identification value (block 610). For example, the network device may receive an advertisement packet from another network device, as described above. In some implementations, the advertisement packet includes information identifying an SR-TE algorithm and an identification value.

As further shown in FIG. 6, process 600 may include determining, based on the identification value, an identifier associated with the other network device (block 620). For example, the network device may determine, based on the identification value, an identifier associated with the other network device, as described above.

As further shown in FIG. 6, process 600 may include updating, based on the identification value, a data structure to indicate that the other network device supports the SRTE algorithm and that the other network device is associated with the identifier (block 630). For example, the network device may update, based on the identification value, a data structure to indicate that the other network device supports the SRTE algorithm and that the other network device is associated with the identifier, as described above.

As further shown in FIG. 6, process 600 may include performing one or more actions based on updating the data structure (block 640). For example, the network device may perform one or more actions based on updating the data structure, as described above.

Process 600 may include additional implementations, such as any single implementation or any combination of implementations described below and/or in connection with one or more other processes described elsewhere herein.

In a first implementation, the identification value is an offset value associated with the SR-TE algorithm, and determining the identifier associated with the other network device includes determining a default identification value associated with the other network device, and determining the identifier based on the default identification value and the identification value.

In a second implementation, alone or in combination with the first implementation, the advertisement packet comprises an ISIS packet or an OSPF packet.

In a third implementation, alone or in combination with one or more of the first and second implementations, performing the one or more actions includes determining, based on updating the data structure and using the SR-TE algorithm, a forwarding path for a data packet, and forwarding the data packet according to the forwarding path.

In a fourth implementation, alone or in combination with one or more of the first through third implementations, performing the one or more actions includes receiving a data packet, processing the data packet to determine a next hop in a forwarding path of the data packet, determining that the network device cannot forward the data packet to the next hop, determining, using the SR-TE algorithm, a different forwarding path for the data packet, and forwarding the data packet according to the different forwarding path.

In a fifth implementation, alone or in combination with one or more of the first through fourth implementations, performing the one or more actions includes determining that the network device cannot forward a data packet according to a forwarding path associated with the data packet, determining, based on determining that the network device cannot forward the data packet according to the forwarding path, that the network device is to determine a different forwarding path for the data packet using the SR-TE algorithm, determining, using the SR-TE algorithm, the different forwarding path, and forwarding the data packet according to the different forwarding path.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
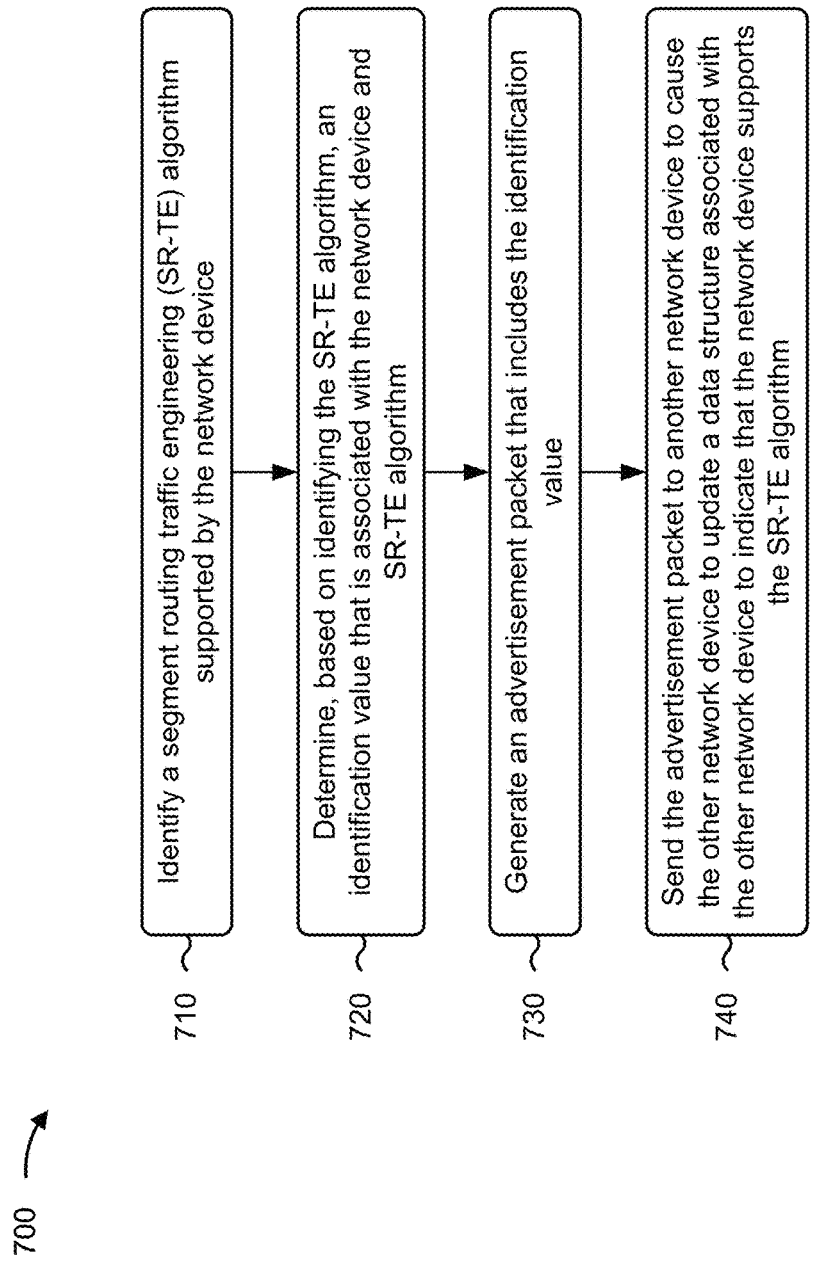

FIG. 7 is a flowchart of an example process 700 associated with supporting multiple segment routing traffic engineering algorithms. In some implementations, one or more process blocks of FIG. 7 may be performed by a network device (e.g., network device 210). In some implementations, one or more process blocks of FIG. 7 may be performed by another device or a group of devices separate from or including the network device, such as a different network device. Additionally, or alternatively, one or more process blocks of FIG. 7 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 7, process 700 may include identifying an SR-TE algorithm supported by the network device (block 710). For example, the network device may identify an SR-TE algorithm supported by the network device, as described above.

As further shown in FIG. 7, process 700 may include determining, based on identifying the SR-TE algorithm, an identification value that is associated with the network device and SR-IL algorithm (block 720). For example, the network device may determine, based on identifying the SR-TE algorithm, an identification value that is associated with the network device and SR-TE algorithm, as described above.

As further shown in FIG. 7, process 700 may include generating an advertisement packet that includes the identification value (block 730). For example, the network device may generate an advertisement packet that includes the identification value, as described above.

As further shown in FIG. 7, process 700 may include sending the advertisement packet to another network device to cause the other network device to update a data structure associated with the other network device to indicate that the network device supports the SR-TE algorithm (block 740). For example, the network device may send the advertisement packet to another network device to cause the other network device to update a data structure associated with the other network device to indicate that the network device supports the SR-TE algorithm, as described above.

Process 700 may include additional implementations, such as any single implementation or any combination of implementations described below and/or in connection with one or more other processes described elsewhere herein.

In a first implementation, determining the identification value includes determining an offset value associated with the SR-TE algorithm, and determining the identification value based on a default identification value associated with the network device and the offset value.

In a second implementation, alone or in combination with the first implementation, the identification value is an offset value associated with the SR-TE algorithm.

In a third implementation, alone or in combination with one or more of the first and second implementations, sending the advertisement packet to the other network device to cause the other network to update the data structure causes the other network device to update the data structure to indicate that the network device supports the SR-TE algorithm and that the network device is associated with the identification value.

In a fourth implementation, alone or in combination with one or more of the first through third implementations, sending the advertisement packet to the other network device to cause the other network to update the data structure causes includes determining an identifier associated with the network device based on the identification value and a default identification value associated with the network device, and updating the data structure to indicate that the network device supports the SR-TE algorithm and that the network device is associated with the identifier.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    identifying, by a network device, a segment routing traffic engineering (SR-TE) algorithm supported by the network device;
    determining, by the network device and based on identifying the SR-TE algorithm, an identification value associated with the network device;
    generating, by the network device, an advertisement packet that includes the identification value and information identifying the SR-TE algorithm; and
    sending, by the network device, the advertisement packet to another network device to cause the other network device to perform one or more actions.

2. The method of claim 1, wherein determining the identification value comprises:
    determining a default identification value associated with the network device;
    determining an offset value associated with the SR-TE algorithm; and
    determining the identification value based on the default identification value and the offset value.

3. The method of claim 1, wherein the identification value is an offset value associated with the SR-TE algorithm.

4. The method of claim 1, further comprising receiving a configuration packet, and
    wherein determining the identification value comprises:
        processing the configuration packet to identify an offset value associated with the SR-TE algorithm; and
        determining the identification value based on the offset value.

5. The method of claim 1, wherein the advertisement packet comprises an intermediate system to intermediate system (ISIS) packet, and
    wherein the identification value and the information identifying the SR-TE algorithm is included in a sub-type, length, and value (sub-TLV) of the ISIS packet.

6. The method of claim 1, wherein the advertisement packet comprises an open shortest path first (OSPF) packet, and
   wherein the identification value and the information identifying the SR-TE algorithm is included in a sub-type, length, and value (sub-TLV) of the OSPF packet.

7. The method of claim 1, wherein sending the advertisement packet to the other network device to cause the other network device to perform the one or more actions causes the other network device to:
   update a data structure to indicate that the network device supports the SR-TE algorithm and that the network device is associated with the identification value.

8. The method of claim 1, wherein sending the advertisement packet to the other network device to cause the other network device to perform the one or more actions causes the other network device to:
   determine an identifier associated with the network device based on the identification value and a default identification value associated with the network device; and
   update a data structure to indicate that the network device supports the SR-TE algorithm and that the network device is associated with the identifier.

9. The method of claim 1, wherein sending the advertisement packet to the other network device to cause the other network device to perform the one or more actions causes the other network device to:
   determine, using the SR-TE algorithm, a forwarding path for a data packet that indicates the network device as a hop in the forwarding path.

10. A network device, comprising:
   one or more memories; and
   one or more processors to:
      receive an advertisement packet from another network device,
         wherein the advertisement packet includes information identifying a segment routing traffic engineering (SR-TE) algorithm and an identification value;
      determine, based on the identification value, an identifier associated with the other network device;
      update, based on the identification value, a data structure to indicate that the other network device supports the SR-TE algorithm and that the other network device is associated with the identifier; and
      perform one or more actions based on updating the data structure.

11. The network device of claim 10, wherein the identification value is an offset value associated with the SR-TE algorithm, and
   wherein the one or more processors, when determining the identifier associated with the other network device, are to:
      determine a default identification value associated with the other network device; and
      determine the identifier based on the default identification value and the identification value.

12. The network device of claim 10, wherein the advertisement packet comprises an intermediate system to intermediate system (ISIS) packet or an open shortest path first (OSPF) packet.

13. The network device of claim 10, wherein the one or more processors, when performing the one or more actions, are to:
   determine, based on updating the data structure and using the SR-TE algorithm, a forwarding path for a data packet; and
   forward the data packet according to the forwarding path.

14. The network device of claim 10, wherein the one or more processors, when performing the one or more actions, are to:
   receive a data packet;
   process the data packet to determine a next hop in a forwarding path of the data packet;
   determine that the network device cannot forward the data packet to the next hop;
   determine, using the SR-TE algorithm, a different forwarding path for the data packet; and
   forward the data packet according to the different forwarding path.

15. The network device of claim 10, wherein the one or more processors, when performing the one or more actions, are to:
   determine that the network device cannot forward a data packet according to a forwarding path associated with the data packet;
   determine, based on determining that the network device cannot forward the data packet according to the forwarding path, that the network device is to determine a different forwarding path for the data packet using the SR-TE algorithm;
   determine, using the SR-TE algorithm, the different forwarding path; and
   forward the data packet according to the different forwarding path.

16. A non-transitory computer-readable medium storing a set of instructions, the set of instructions comprising:
   one or more instructions that, when executed by one or more processors of a network device, cause the network device to:
      identify a segment routing traffic engineering (SR-TE) algorithm supported by the network device;
      determine, based on identifying the SR-TE algorithm, an identification value that is associated with the network device and SR-TE algorithm;
      generate an advertisement packet that includes the identification value; and
      send the advertisement packet to another network device to cause the other network device to update a data structure associated with the other network device to indicate that the network device supports the SR-TE algorithm.

17. The non-transitory computer-readable medium of claim 16, wherein the one or more instructions, that cause the network device to determine the identification value, cause the network device to:
   determine an offset value associated with the SR-TE algorithm; and
   determine the identification value based on a default identification value associated with the network device and the offset value.

18. The non-transitory computer-readable medium of claim 16, wherein the identification value is an offset value associated with the SR-TE algorithm.

19. The non-transitory computer-readable medium of claim 16, wherein sending the advertisement packet to the other network device to cause the other network to update the data structure causes the other network device to:
   update the data structure to indicate that the network device supports the SR-TE algorithm and that the network device is associated with the identification value.

20. The non-transitory computer-readable medium of claim 16, wherein sending the advertisement packet to the other network device to cause the other network to update the data structure causes the other network device to:
 determine an identifier associated with the network device based on the identification value and a default identification value associated with the network device; and
update the data structure to indicate that the network device supports the SR-TE algorithm and that the network device is associated with the identifier.

\* \* \* \* \*